US008024815B2

(12) United States Patent
Lorch et al.

(10) Patent No.: US 8,024,815 B2
(45) Date of Patent: Sep. 20, 2011

(54) ISOLATION ENVIRONMENT-BASED INFORMATION ACCESS

(75) Inventors: Jacob R. Lorch, Bellevue, WA (US); Yi-Min Wang, Bellevue, WA (US); Chad Verbowski, Redmond, WA (US); Helen J. Wang, Issaquah, WA (US); Samuel King, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 11/532,127

(22) Filed: Sep. 15, 2006

(65) Prior Publication Data

US 2008/0127355 A1    May 29, 2008

(51) Int. Cl.
*G06F 7/04* (2006.01)
*G06F 17/30* (2006.01)
(52) U.S. Cl. .......................................................... 726/29
(58) Field of Classification Search .................... 726/27, 726/29; 713/187
See application file for complete search history.

(56) References Cited

U.S. PATENT DOCUMENTS

| 6,907,396 | B1 | 6/2005 | Muttik et al. | |
|---|---|---|---|---|
| 7,007,301 | B2 | 2/2006 | Crosbie et al. | |
| 2002/0194496 | A1* | 12/2002 | Griffin et al. | 713/200 |
| 2003/0115458 | A1* | 6/2003 | Song | 713/165 |
| 2003/0212902 | A1 | 11/2003 | van der Made | |
| 2004/0049693 | A1 | 3/2004 | Douglas | |
| 2004/0187010 | A1 | 9/2004 | Anderson et al. | |
| 2005/0187740 | A1 | 8/2005 | Marinescu | |
| 2005/0204150 | A1 | 9/2005 | Peikari | |
| 2005/0229250 | A1 | 10/2005 | Ring et al. | |
| 2005/0268338 | A1 | 12/2005 | Made | |
| 2006/0075490 | A1* | 4/2006 | Boney et al. | 726/22 |
| 2006/0184938 | A1* | 8/2006 | Mangold | 718/1 |
| 2007/0032228 | A1* | 2/2007 | Varanda | 455/418 |
| 2007/0050686 | A1* | 3/2007 | Keeton et al. | 714/48 |

FOREIGN PATENT DOCUMENTS

| GB | 2404262 A | 1/2005 |
|---|---|---|
| WO | WO2005116804 A2 | 12/2005 |

OTHER PUBLICATIONS

Dunlap, et al., "ReVirt: Enabling Intrusion Analysis through Virtual-Machine Logging and Replay", Proceedings of the 2002 Symposium on Operating Systems Design and Implementation, 14 pages.
Jackson, et al., "Spyware Resistant Web Authentication Using Virtual Machines", 20 pages.
Quist, et al., "Detecting the Presence of Virtual Machines Using the Local Data Table", Offensive Computing, 9 pages.
Vrable, et al., "Scalability, Fidelity, and Containment in the Potemkin Virtual Honeyfarm", SOSP, Oct. 23-26, 2005, pp. 148-152.
Garfinkel, et al., "Terra: A Virtual Machine-Based Platform for Trusted Computing", SOSP, Oct. 19-22, 2003, 14 pages.

* cited by examiner

*Primary Examiner* — Jason K Gee
(74) *Attorney, Agent, or Firm* — Lee & Hayes, PLLC

(57) ABSTRACT

In an embodiment of isolation environment-based information access, programs—including operating systems and applications—running on a computing-based device can be isolated in an environment such as a virtual machine. Information including commands and/or data transmitted between the computing-based device and the program(s) being run, as well as information associated with the program(s) and the computing-based device, is accessed without being detected by the program(s). In one implementation, the information includes state information as well as commands and/or data—including sensitive information, such as usernames and passwords. In another implementation, the information can be used to secretly access the program(s).

19 Claims, 12 Drawing Sheets

ISOLATION ENVIRONMENT-BASED INFORMATION ACCESS

BACKGROUND

Computer systems are widely used by consumers and business entities for a variety of functions. In many instances these functions can be associated with sensitive and/or confidential information. This has attracted the attention of individuals who wish to devise methods to attack the computer systems of others and can gain unfettered control of the systems without being detected.

Presently, attacks can be carried out in a variety of manners, and from a variety of sources. This has been exacerbated by the proliferation of widespread Internet access, allowing users to download files from locations around the globe, which may include infected content such as viruses, worms, etc.

SUMMARY

This summary is provided to introduce simplified concepts of isolation environment-based information access, which is further described below in the Detailed Description. This summary is not intended to identify essential features of the claimed subject matter, nor is it intended for use in determining the scope of the claimed subject matter.

In an embodiment of isolation environment-based information access, programs—including operating systems and applications—running on a computing-based device can be isolated in an environment such as a virtual machine. Information including commands and/or data between the computing-based device and the program(s) being run, as well as information associated with the program(s) and the computing-based device, are accessed without being detected by the program(s). In one implementation, the information includes state information as well as commands and/or data—including sensitive information, such as usernames and passwords. In another implementation, the information can be used to secretly access the program(s).

In another embodiment of isolation environment-based information access, isolation of programs in environments such as virtual machines can be detected by analyzing various parameters of a program being run in the environment versus the same parameters of the program being run outside the environment. For example, a run time of a program isolated in an environment will differ from a run time of the program being run outside of the environment.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

DETAILED DESCRIPTION

Isolation environment-based information access is described in which embodiments provide for the access of information associated with a program and/or hardware on a computing-based device on which the program is being run. The information can include a state of the program or hardware, data accessed or generated by the program, commands and data exchanged between the program and the hardware, and commands and data exchanged between the program and other programs being run on the same computing based-device or other computing-based devices.

In one embodiment, the program is an operating system isolated in an isolation environment. Since the isolation environment is between the operating system and hardware of a computing-based device on which the operating system is being run, communications between the operating system and the hardware can be intercepted by various applications. These applications include the isolation environment, a program isolation system, one or more intercepting applications running in another isolation environment, and one or more intercepting applications running on the program isolation system.

In another embodiment, the program is an application isolated in an isolation environment between the application and hardware of a computing-based device on which the application is being run. Information associated with the application, such as information generated by the program (including private keys, etc.) can be secretly accessed by various applications, including the isolation environment, a program isolation system, one or more intercepting applications running in another isolation environment, and one or more intercepting applications running on the program isolation system. Moreover, information associated with the hardware, such as the state of the hardware, or files and/or settings stored on the hardware, can also be secretly accessed by various applications, including the isolation environment, a program isolation system, one or more intercepting applications running in another isolation environment, and one or more intercepting applications running on the program isolation system.

In another embodiment of isolation environment-based information access, installation of unauthorized isolation environments on a computing-based device can be prevented by booting the computing-based device from a secure boot sector.

While aspects of the described systems and methods for isolation environment-based information access can be implemented in any number of different computing systems, environments, and/or configurations, embodiments of isolation environment-based information access are described in the context of the following exemplary system architecture(s).

An Exemplary System

Figure 1:
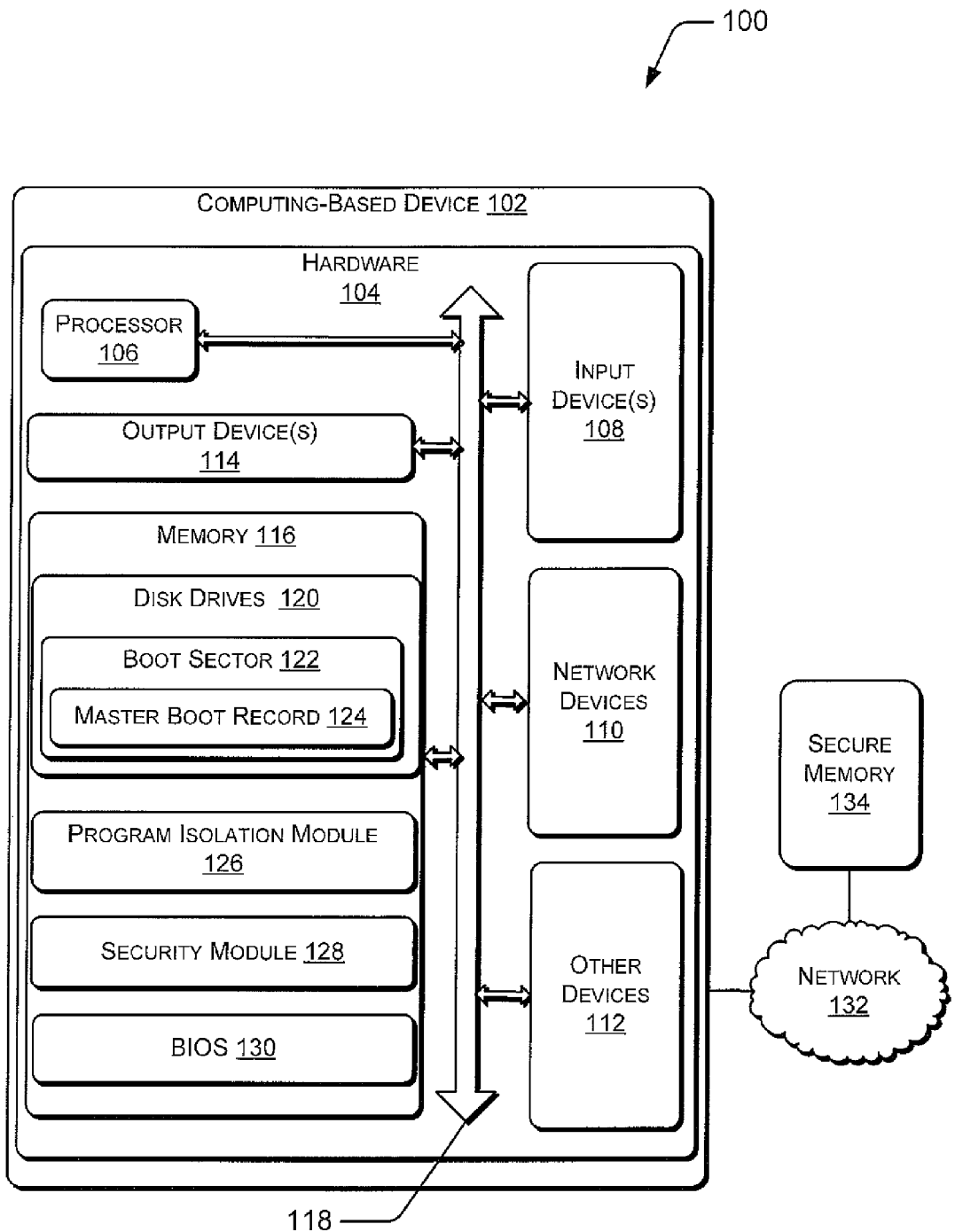
FIG. 1 illustrates an exemplary computing-based device in an embodiment of isolation environment-based information access.

FIG. 1 illustrates an exemplary system 100 for isolation environment-based information access. System 100 includes a computing-based device 102 including hardware 104 for implementing functions, such as computing, gaming, controlling, communicating with computing-based devices, etc. Computing-based device 102 can include a personal computer, a server, a game controller, a router, a firewall, an instrumentation systems controller, a digital media player, a wireless access point, a personal communication device, etc., or any combination of such devices.

Hardware 104 can include one or more of processor(s) 106, as well as input device(s) 108, network device(s) 110, and other devices 112. Input device(s) 108 can include devices which can be used to input command(s) or data to computing-based device 102. For example, input device(s) 108 can include a mouse, a keyboard, a light pen, a digitizer, a scanner, a track ball, a USB device, etc.

Network device(s) 110 can include devices such as network interface cards, WLAN cards, USB ports, serial ports, parallel ports, firewire ports, and bluetooth ports capable of connecting computing-based device 102 to a network. Other device(s) 112 can include devices for special functions, such as cameras, microphones, voice over IP (VoIP) devices, etc.

Hardware 104 can also include output devices 114, memory 116 and a system bus 118. Output device(s) 114 can include devices configured to display or store outputs of computing-based device 102. For example, output device(s) 114 can include monitors, printers, plotters, etc.

Memory 116 can include computer-readable media in the form of volatile memory, such as random access memory (RAM), and/or non-volatile memory, such as read only memory (ROM). RAM typically includes data and/or program modules that are immediately accessible to and/or presently operated on by the processor 106.

Memory 116 includes disk drive(s) 120, which can include computer-readable media in the form of disk drives in which content is modifiable. Disk drive(s) 120 can include hard disk drives, floppy drives, memory sticks, rewritable optical disks, etc. Moreover, disk drive(s) 120 may further include a boot sector 122 and a master boot record 124, which can be modifiable and can be used for booting computing-based device 102.

Memory 116 can include a program isolation module 126 configured to isolate application(s) running on computing-based device 102 by isolating the applications in one or more isolation environments, such as virtual machines. While isolated, the application(s) can be restricted from accessing data, commands, hardware and other resources outside the isolation environment in which they are running. Program isolation module 126 can be implemented in software and/or hardware and can utilize numerous methods and structures for isolating applications, including virtual machine monitors, virtualization layers, or any other technology in which running applications can be isolated in an environment on a computing-based device.

In one possible implementation, program isolation module 126 can be loaded from memory 116 before any other application(s) are loaded from memory 116 during a boot up operation of computing-based device 102.

Memory 116 can also include a security module 128 configured to detect isolation environments, and instructions to implement isolation environments, on computing-based device 102.

Memory 116 can further include a basic input/output system (BIOS) 130, including basic routines that help to transfer information between elements within computing-device 102, such as during start-up. In one implementation, BIOS 130 can be stored in ROM in memory 116.

Memory 116 can be coupled to other elements within computing-based device 102 by system bus 118. System bus 118 can couple one or more devices of hardware 104 including processor(s) 106, input devices 108, network devices 110, other devices 112, output devices 114, disk drive(s) 120 and memory 116, to each other. System bus 118 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing-based device 102 can also be coupled to a network 132, which can further be connected to one or more secure memory(s) 134. Network 132 can be a LAN, MAN, WAN, USB link, serial link, parallel link, wireless link, infrared link, a combination thereof, or any other networking technology known in the art.

Secure memory(s) 134 includes devices on which stored data and/or instructions cannot be modified for example, ROMs, PROMs, optical disks such as CDROMs, DVDROMs, etc. Additionally, secure memory(s) 134 can be controlled access device(s) for example, write protected memory devices such as write protected USB memory device(s), write protected floppy disk or memory devices which are not modifiable without authentication. Secure memory(s) 134 can also include memory devices having one or more of an authenticated program, authenticated instructions, authenticated data and so on, where data and instructions stored in secure memory(s) 134 are authenticated and not modifiable after authentication. Though illustrated as being outside of computing-based device 102 in FIG. 1, secure memory(s) 134 can also be included in computing-based device 102. In one embodiment, secure memory(s) 134 can be part of memory 116.

Figure 2:
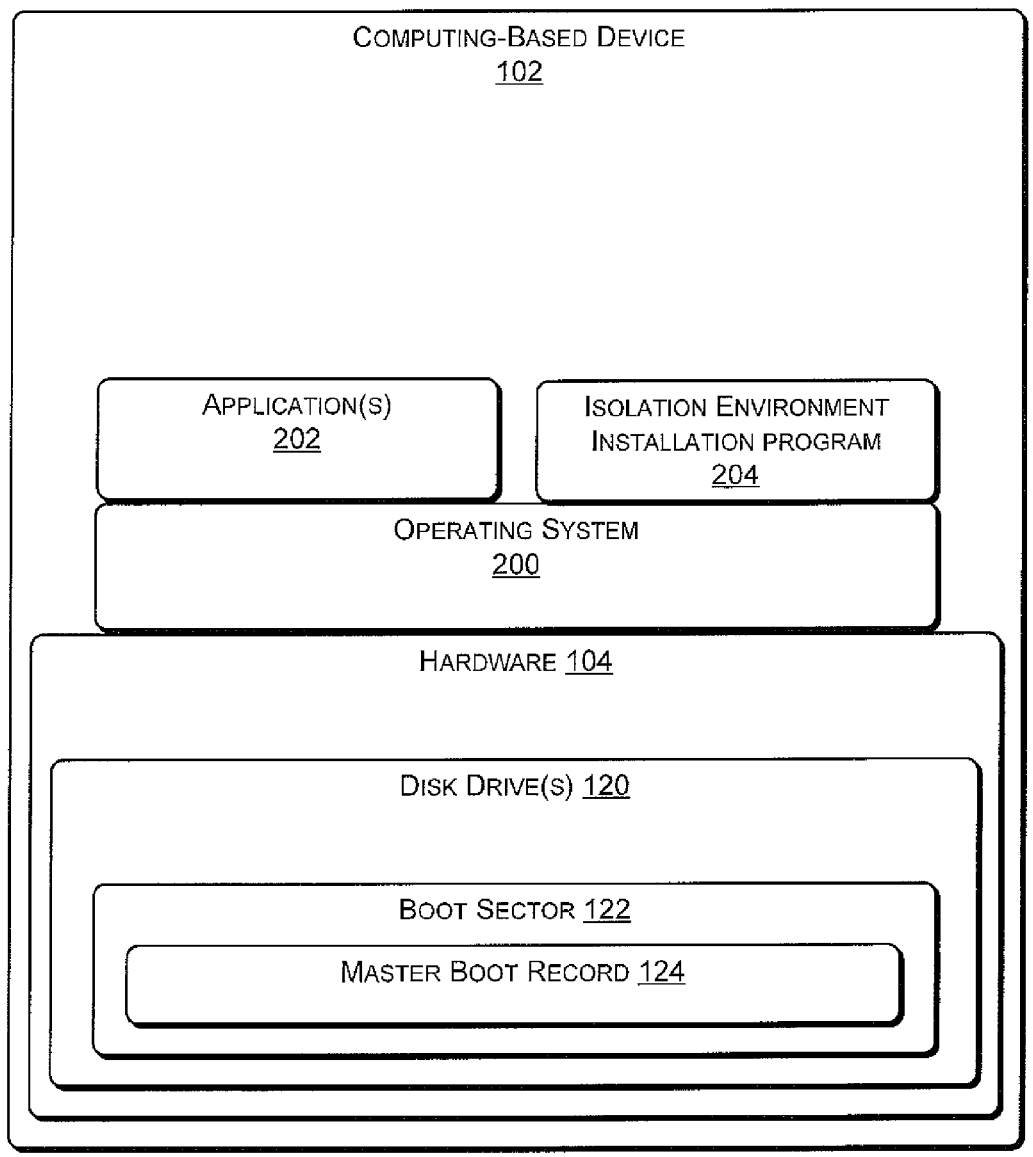
FIG. 2 illustrates an exemplary computing-based device before implementation of isolation environment-based information access.

FIG. 2 provides a functional illustration of programs being run on computing-based device 102. These programs include an operating system 200, one or more applications) 202, and an isolation environment installation (IEI) program 204 (which will be described in greater detail below). Application(s) 202 can include any applications known in the art, including web browsers, word processors, games, spreadsheets, web servers, instant messengers, key stroke loggers, password parsers, file system scanners, search engines, virtual machine detection prevention tools, and so on.

IEI program 204 can be configured to load program isolation module 126 onto computing-based device 102. IEI program 204 can also include instructions to altering the boot sector 122 and/or master boot record 124 of computing device 102 such that programs running on computing-based device 102, including operating system 200 and application(s) 202, can be run in an environment isolated from hardware 104. In one possible implementation, instructions for creating and running isolated environments can be included within IEI program 204. In another possible implementation, IEI program 204 can include instructions to call program isolation module 126 and retrieve instructions for creating and running isolated environments from program isolation module 126.

While isolated, the programs can be partially or fully restricted from accessing data, commands, hardware and other resources outside the isolation environment in which they are running. Moreover, information regarding resources of hardware 104 accessible to the programs can be controlled. Additionally, information such as states, data, settings, and commands associated with the programs and hardware 104 can be accessed and controlled, and disinformation regarding the resources of hardware 104 can be provided to the programs.

Operating system 200, application(s) 202, and IEI program 204 can be stored in various places within computing device 102, including disk drive(s) 120 and memory 116.

IEI program 204 can be loaded onto computing-based device 120 in a variety of ways. For example, IEI program 204 can be loaded by one or more of the programs running in computing-based device 102, such as operating system 200 and application(s) 202. Alternately, IEI program 204 can be loaded from sources such as disk drives, USB storage devices, optical storage devices, or one or more networked devices coupled to computing-based device 102.

Moreover, IEI program 204 can be loaded onto computing-based device 102 through use of one or more of a virus, worm, spyware, trojan, and so on. IEI program 204 can also be purposefully or inadvertently loaded by a user or other entity interacting with computing-based device 102. For example, a user interacting with computing-based device 102 can knowingly or unknowingly implement the loading of a worm or virus including IEI program 204 by visiting a web site, opening an email, opening or viewing an attachment, running an application, and so on.

Moreover, IEI program 204 can be loaded into computing-based device 102 through direct user interaction. For example, a user may knowingly and purposefully load IEI program 204 onto computing-based device 102 through a keyboard or other input device 108.

Once loaded onto computing-based device 102, IEI program 204 can access one or more of the boot sector 122 and master boot record 124 and alter a boot sequence used by computing-based device 102 when computing-based device 102 boots up. Alternately, IEI program 204 can load program isolation module 126 into memory 116, to perform similar tasks as those ascribed to IEI program 204 herein.

In one implementation, IEI program 204 accesses boot sector 122 and master boot record 124 directly. In another possible implementation, IEI program 204 accesses boot sector 122 and master boot record 124 through use of a program, such as one of application(s) 202 or operating system 200. In yet another possible embodiment, IEI program 204 can access boot sector 122 and master boot record 124 by modifying access rights of one or more programs running on computing-based device 102 to that of a super-user, administrator, root or equivalent. In another possible embodiment, IEI program 204 can access boot sector 122 and master boot record 124 by exploiting vulnerabilities in operating systems, such as operating system 200, or applications, such as application(s) 202, running on computing-based device 102. In yet another embodiment, IEI program 204 can access boot sector 122 and/or master boot record 124 by exploiting one or more vulnerabilities of programs running on computing-based device 102 to modify access rights.

Once access to boot sector 122 and/or master boot record 124 has been achieved, IEI program 204 can make deletions, amendments or additions to either or both of boot sector 122 and/or master boot record 124 such that upon boot up, computing-based device 102 will be directed to load one or more isolation environments, such that other programs can be subsequently loaded and run on computing-based device 102 and be isolated from hardware 104 by one or more isolation environments.

Figure 3:
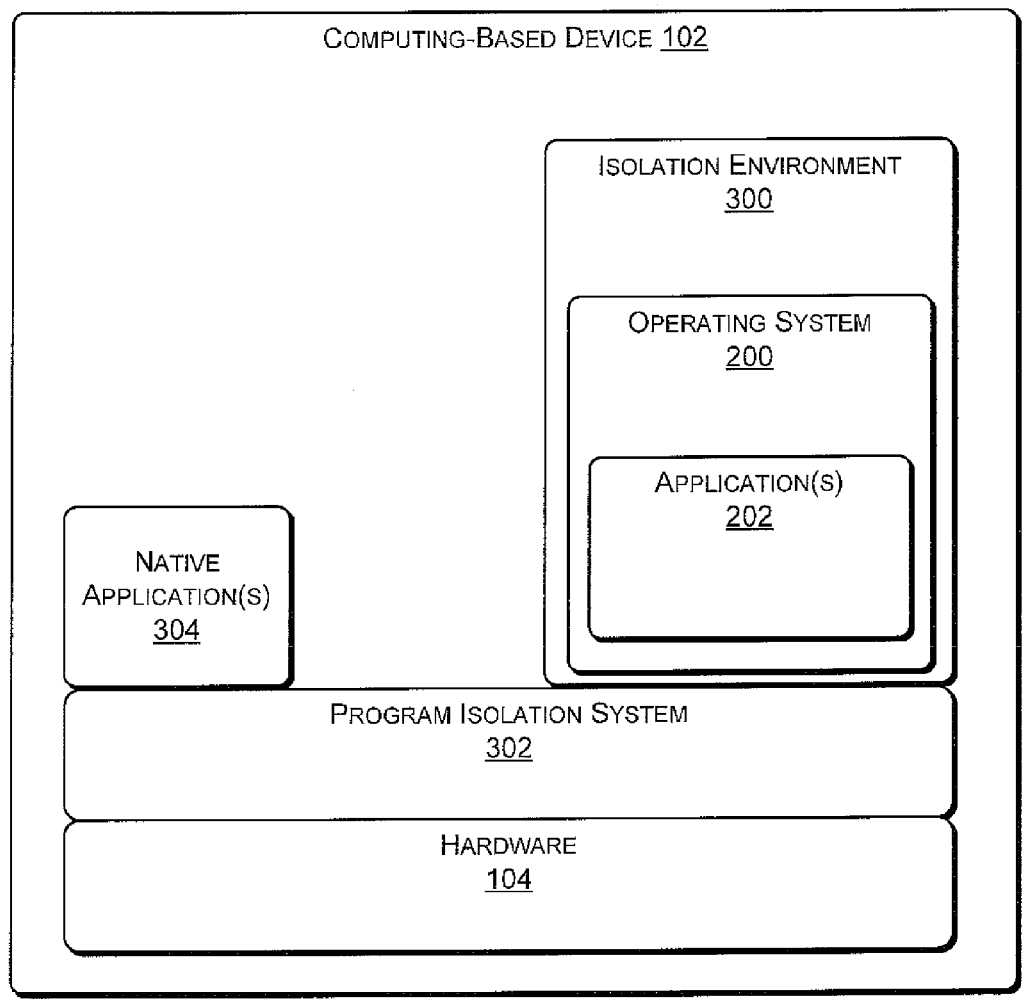
FIG. 3 illustrates an exemplary computing-based device in which programs are isolated in an isolation environment in an embodiment of isolation environment-based information access.

FIG. 3 provides a functional illustration of computing-based device 102 on which one or more isolation environments 300 are running. Isolation environment 300 includes any environment in which programs can be run and isolated, at least in part, from elements of hardware 104. In one possible implementation, isolation environment 300 can be a virtual machine.

As noted above, IEI program 204 alters one or more of boot sector 122 and master boot record 124 to include instructions to load and run isolation environment 300 when computing-based device 102 is booted up. Subsequent programs loaded and run in the course of boot up of computing-based device 102, such as operating system 200 or application(s) 202, can be isolated within isolation environment 300.

In one implementation, IEI program 204 alters one or more of boot sector 122 and master boot record 124 to include instructions to load and run a program isolation system 302 when computing-based device 102 is booted up. In one implementation, program isolation system 302 can be a virtual machine monitor. Once program isolation system 302 has been loaded and is running, isolation environment 300 can be loaded on program isolation system 302. Programs subsequently loaded and run in the course of boot up of computing-based device 102, such as operating system 200 or application(s) 202, can be isolated through use of isolation environment 300 and/or program isolation system 302.

While running, programs on computing-based device 102, such as operating system 200 and application(s) 202, can utilize various resources in hardware 104, such as processor(s) 106, disk drive(s) 120, and memory 116. Moreover, application(s) 202 can communicate to resources in hardware 104 through operating system 200.

Because operating system 200 and application(s) 204 are running within isolation environment 300, however, information communicated between operating system 200 and application(s) 204 must also be transmitted through isolation environment 300 and, if extant, program isolation system 302 before the information can be received by hardware 104. As a result, information communicated between the programs running in isolation environment 300 and hardware 104 is subject to interception, modification, deletion, tampering and so on without the programs' knowledge.

For example, in one implementation, application(s) 202 can include a word processor being run in conjunction with operating system 200. If a user working on the word processor wishes to access a document stored in disk drive(s) 120, a request will be transmitted from the word processor in application(s) 202 to disk drive(s) 120 through operating system 200. This request can be intercepted as it passes through isolation environment 300 or program isolation system 302. Alternately, the request can be intercepted after it has left either isolation environment 300 program or isolation system 302. Possible elements which can intercept the request include native applications 304 on computing device 102, as well as isolation environment 300, program isolation system 302, and program isolation module 126.

Moreover, isolation environment 300 and program isolation system 302 can be used independently, or in combination, to access and/or modify information such as files or settings stored on hardware 104 at any time. Since operating system 200 and application(s) 204 are running within isolation environment 300 on top of program isolation system 302, the access and/or modification of hardware 104 can be accomplished without being detected by computing-based device 102 or programs, such as application(s) 204 and operating system 200, running on hardware 104.

Similarly, isolation environment 300 and program isolation system 302 can be used independently, or in combination, to covertly access and/or modify information, such as files, which have been generated by, or are associated with, programs running in isolation environment 300 and/or on program isolation system 302. For example, if one of application(s) 204 is a web browser, isolation environment 300 and/or program isolation system 302 can access passwords stored in memory associated with the web browser without the web browser's knowledge. Similarly, isolation environment 300 and/or program isolation system 302 can effect a transmission of the passwords to a pre-chosen location, such as a web site or a remote server. This can be done by reprogramming the web browser to transmit the passwords to the pre-chosen site.

Moreover, by exerting control over hardware 104 of computing based-device 102, isolation environment 300 and/or program isolation system 302 can utilize resources of computing-based device 102 without being detected by computing-based device 102 or programs running on computing-based device 102. For example, isolation environment 300 and/or program isolation system 302 could control all or a portion of the resources of computing-based device 102 to perform a task such as sending emails. Alternately, isolation environment 300 and/or program isolation system 302 could include computing-based device 102 in a zombie net.

In another possible embodiment accessed information associated with operating system 200, application(s) 202, and hardware 104 may be saved by native application(s) 304 using resources of hardware 104 such as memory 116 and disk drive(s) 120. Alternately, the information may be transmitted from computing-based device 102 over a network, such as network 132, or via removable storage such as CDs, DVDs, or USB drives. In either case, isolation environment 300 and/or program isolation system 302 can provide programs such as operating system 200 and application(s) 202 with disinformation cloaking the interactions of native application(s) 304 with the information, such that the interactions are invisible to the programs.

Moreover, when programs such as operating system 200 and application(s) 202, are run within an isolation environment 300 or on program isolation system 302, the programs may be effectively controlled to receive only information regarding hardware resources 104 presented to them by isolation environment 300 or program isolation system 302. As a result, programs such as operating system 200 and application(s) 202 within isolation environment 300 or on program isolation system 302 can be fed disinformation regarding the true status of resources within hardware 104. In this way, operating system 200 and application(s) 202 can be deceived regarding the real state of resources in hardware 104.

For example, in another possible implementation, application(s) 202 can include detection software, such as virus detection applications and spyware detection applications. These applications can be fed misinformation regarding a true state of hardware 104 by isolation environment 300 or program isolation system 302, thus preventing the detection software from discovering the existence of isolation environment 300 and/or program isolation system 302. Moreover, in this same manner, the efforts of isolation environment 300 and/or program isolation system 302, as well as other programs, to access information associated with hardware 104 and other programs running on computing device 102 can be hidden from the detection applications.

Disinformation regarding the state of resources in hardware 104 fed by isolation environment 300 and/or program isolation system 302 to operating system 200 and application(s) 202 can preclude operating system 200 and application(s) 202 from discovering that they are operating within isolation environment 300 or on program isolation system 302 rather than running directly on hardware 104. Thus, users working on programs such as application(s) 202 running in isolation environment 300 or on program isolation system 302 will not be able to detect that they are working within isolating environment 300 or on program isolation system 302.

Moreover, with the creation of program isolation system 302 and/or isolation environment 300, other applications such as native application(s) 304 can be run on computing-based device 102 away from possible detection by any of hardware 104, or programs such as operating system 200 or applications 202. Thus native application(s) 304 can use the resources of hardware 104, such as storage (in various forms including memory 116, disk drive(s) 120) and processing without operating system 200 or application(s) 202 being aware of such use. Rather, either or both of program isolation system 302 and isolation environment 300 can present purposefully erroneous information to operating system 200 and application(s) 202 cloaking the current state of resources of hardware 104. This erroneous information can represent that no storage or processing is being used by native application(s) 304. In such a way, isolation environment 300 and/or program isolation system 302 can effectively hide the presence and effects of native application(s) 304 from programs such as application(s) 202 and operating system 200.

In one implementation, program isolation module 126 controls the information received by programs running within isolation environment 300. In other possible implementations other elements, such as native application(s) 304, program isolation system 302, and isolation environment 300 can control the information received through isolation environment 300 or program isolation system 302 by programs running on computing-based device 102.

It will also be understood that more than one isolation environment 300 may be run on computing-based device 102 simultaneously. Such a configuration will be discussed in more detail in FIG. 4 below. Moreover, it will also be understood that one or more program isolation systems 302 may also be run on computing-based device 102.

Figure 4:
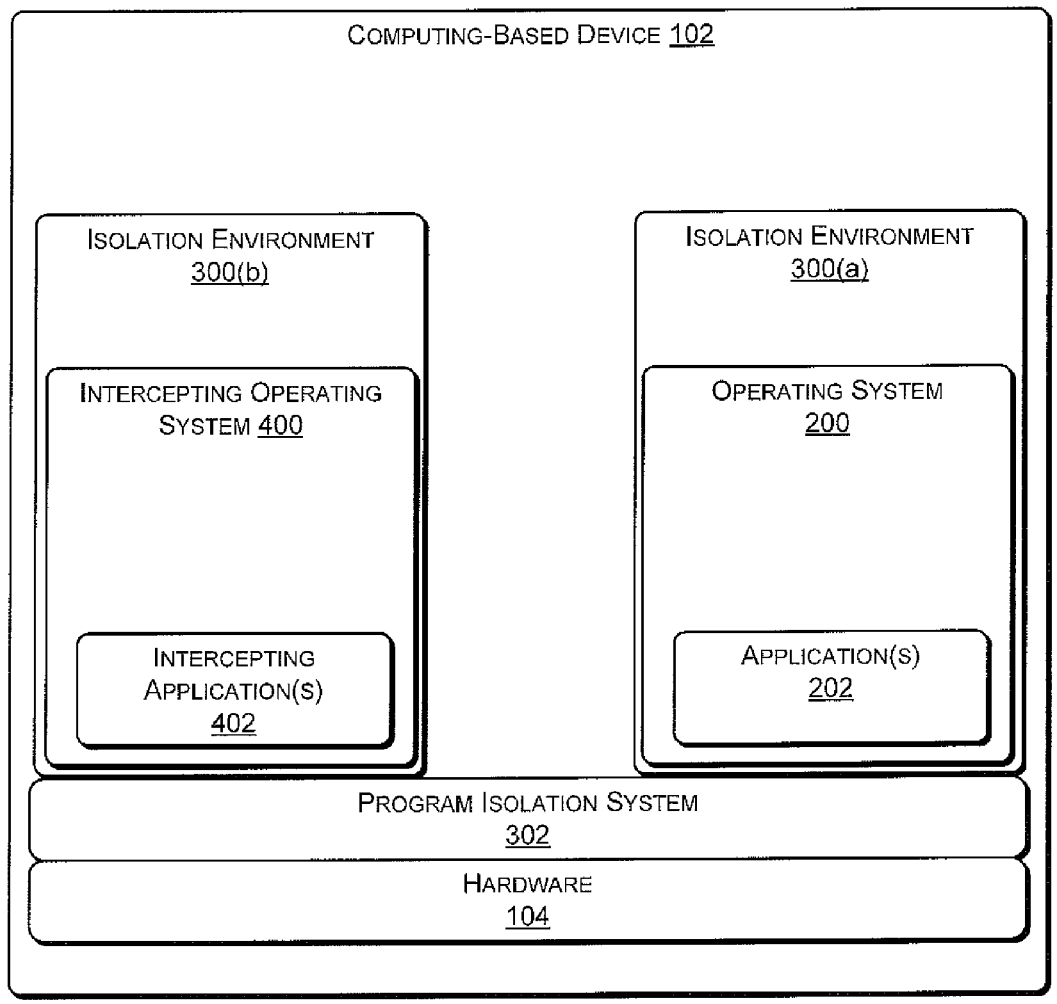
FIG. 4 illustrates another exemplary computing-based device in which programs including an intercepting operating system are isolated in an isolation environment in an embodiment of isolation environment-based information access.

FIG. 4 provides a functional illustration of an embodiment of isolation environment-based information access in which one or more programs are running in a plurality of isolation environments 300 on computing-based device 102. In such a configuration, programs in a first isolation environment 300(*a*) may be effectively controlled to receive only information regarding hardware resources 104 presented to them by isolation environment 300(*a*), or program isolation system 302. Consequently, operating system 200 and application(s) 202 can be deceived regarding the real state of resources in hardware 104. Moreover, such disinformation regarding the state of resources in hardware 104 can preclude operating system 200 and application(s) 202 from discovering that they are operating within isolation environment 300(a). Instead, information can be provided to operating system 200 and application(s) 202 simulating information they would receive were they running directly on hardware 104.

Though FIG. 4 illustrates a single isolation environment 300(a), it will be understood that a plurality of isolation environments 300(a) may be run simultaneously on computing-based device 102. Furthermore each of the plurality of isolation environments 300(a) may isolate different programs. For example, a first isolation environment 300(a) may isolate a first operating system and a word processor program being used by a first user. Simultaneously, a second isolation environment 300(a) may isolate a second operating system and a web browser being used by a second user.

As discussed above, isolation environments 300(a) and program isolation system 302 can provide disinformation to the programs running within the various isolation environments 300(a) or on program isolation system 302 such that users working on programs running in the various isolation environments 300(a) or on program isolation system 302 will not be able to detect that the programs with which they are interacting are running within isolating environments 300(a) or on program isolation system 302. This can be repeated with many programs running in many separate isolation environments 300(a) such that none of the programs know of the existence or operation of other programs operating in other isolation environments 300(a).

In one implementation, program isolation module 126 controls the information received by programs running within isolation environment 300. In other possible implementations other elements such as native application(s) 304, program isolation system 302, and isolation environment(s) 300 can control the information received through isolation environment 300(a) or program isolation system 302 by programs running within isolation environment 300.

Also, in one possible implementation, one or more separate isolation environments 300(b) can be established to isolate programs configured to collect information regarding other programs running on computing-based device 102. For example, as shown in FIG. 4, an intercepting operating system 400 and intercepting application(s) 402 can be isolated within isolation environment 300(b). By isolating these programs, their existence and operation can be effectively hidden from other programs such as operating system 200 and applications 202 running in isolation environments 300(a) on computing-based device 102. Additionally, by running programs such as operating system 400 and intercepting application(s) 402 in isolation environment 300(b) the existence of operating system 400 and intercepting applications 402 can be hidden from applications running outside of isolation environments 300(a).

Moreover, the programs isolated in isolating environment 300(b) can be configured to stealthily access communications between programs running in other isolation environments 300(a) and hardware 104. For example, in one implementation, intercepting application(s) 402 can secretly access communications from application(s) 202 at environment 300(a), program isolation system 302, or anywhere between environment 300(a) and hardware 104. Access in this manner cannot be detected by programs running in isolation environment 300(a).

Moreover, intercepting application(s) 402 can exert control over programs such as application(s) 202, in isolation environment 300(a). For example, intercepting application(s) 402 can emulate resources in hardware 104, and transmit deceptive communications to application(s) 202 manipulating application(s) 202 in any of a manner of ways. Intercepting application(s) 402 can also access and modify information including data, commands and settings associated with application(s) 202 and hardware 104.

Further, information such as communications intercepted from programs running in isolation environment 300(a) can be examined for sensitive information, such as login names, passwords, etc., enabling an entity such as intercepting application(s) 402, or a user, to later login into accounts though use of such login names, passwords, etc.

In addition to secretly intercepting, copying, deleting and modifying communications between hardware 104 and programs in isolation environment(s) 300(a), programs running within isolation environment 300(b) can also secretly store information from these communications using resources of hardware 104 such as memory 116 and disk drive(s) 120. Alternately, information associated with the communications can be secretly transmitted from computing-based device 102 over a network, such as network 132, or via removable storage such as CDs, DVDs, or USB drives. In whatever case, isolation environment(s) 300 can provide programs isolated within them with disinformation cloaking the interactions of programs within isolation environment(s) 300(b) with the communications, such that the interactions are invisible to the programs running in isolation environments 300(a)

Figure 5:
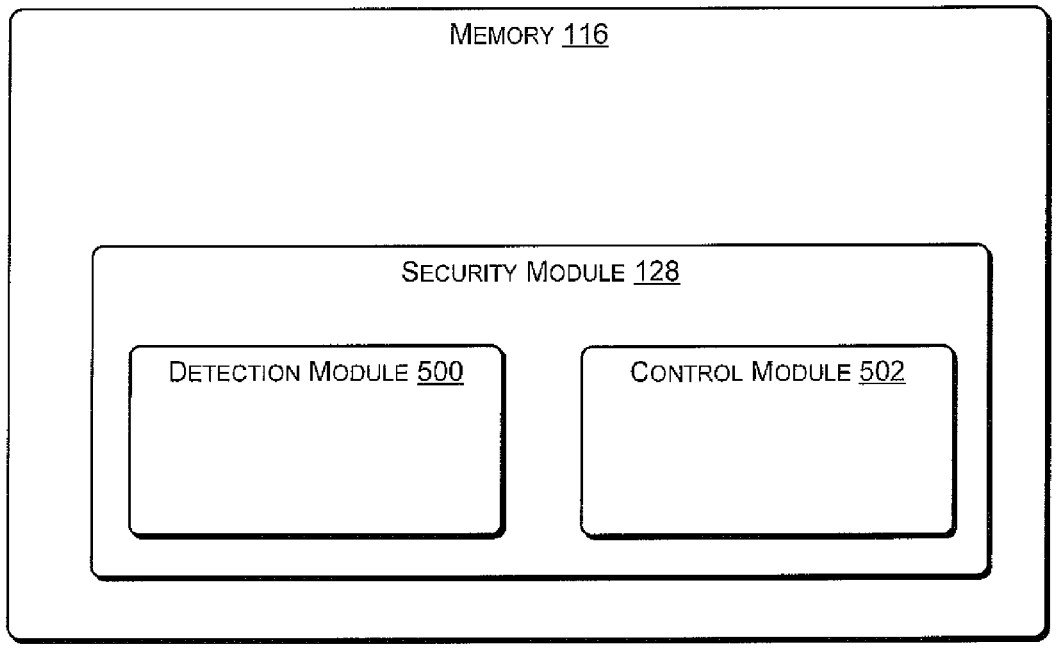
FIG. 5 illustrates a security module for detecting isolation environments in an embodiment of isolation environment-based information access.

FIG. 5 Illustrates a security module 128 which can be used to detect the presence of isolation environments 300, program isolation systems 302, or instructions configured to create isolation environments 300 and program isolation systems 302. As shown, security module 128 can reside in memory 116. It will also be understood that security module 128 can also reside on portable memory devices, such as optical discs or USB drives, remote memory devices, such as secure memory(s) 134, or in the memory of other computing-based devices.

In one exemplary implementation, security module 128 measures metrics regarding the performance of computing device 102 and/or metrics of programs being run on computing-based device 102. For example, times required to load or execute programs—such as word processors, web browsers, email clients, graphic applications, etc.—on computing-based device 102 can be logged. Times can be measured through use of, for example, an inbuilt clock, a real time clock, or an external clock.

Execution times for programs can be measured by observing the time it takes for the program to execute one or more commands such as to save or open a file, to load an image, to parse a file, to index a database, etc. Commands may be issued to programs being measured either automatically or manually. Moreover, commands may be issued to programs being measured by programs running on computing-based device 102 or by programs running on devices connected to the computing-based device over networks, such as network 132, on serial port(s), parallel port(s), etc. In one implementation, the execution times are collected by a detection module 500 within security module 128.

Security module 128 can compare the metrics measured regarding the performance of computing-based device 102— or programs running on computing-based device 102—with control values for the same operations measured on a model computing-based device without an isolation environment, such as isolation environment 300 and program isolation system 302. In one implementation, the control values can be received from a secure memory such as secure memory(s) 134.

For example, an execution time for a program to open a file on computing-based device 102, can be compared against a control value measured on a model computing-based device to perform the same operation. Differences between execution times measured on computing-based device 102 and the model computing-based device, if any exist, can be called residual times. In one implementation, receipt of the control values and/or comparison of the control values against the observed execution times of computing-based device 102 can be implemented by detection module 500.

In one embodiment, each residual time is adjusted for known differences of performance in computing-based device 102 versus the model computing-based device used to derive the control values. For example, if the model computing-based device has a faster processor than computing-based device 102, the processor speeds can be examined to determine an expected difference between the two devices if both devices are devoid of isolation environments. In one implementation, residual times can be adjusted by detection module 500.

If no residual time exists before or after residual times are adjusted, then security module 128 and/or detection module 500 can deduce that an isolation environment 300 or program isolation system 302 is likely not present on computing-based device 102.

Alternately, if a finalized residual time does exist, security module 128 and/or detection module 500 can deduce that an isolation environment 300 or program isolation system 302 exists on computing-based device 102. Or, in one possible implementation, security module 128 and/or detection module 500 can deduce that an isolation environment 300 or program isolation system 302 exists on computing-based device 102 if the finalized residual time is greater than a pre-determined error margin value calculated to take into account factors such as measuring errors, etc.

If it is found that an isolation environment 300 or program isolation system 302 exists on computing-based device 102, security module 128 and/or control module 502 can check the isolation environment 300 or program isolation system 302 to see if it is legal. In one implementation, an isolation environment 300 or program isolation system 302 can be deduced to be legal if it is registered with computing-based device 102. In another possible implementation, an isolation environment 300 or program isolation system 302 can be deduced to be legal if it is listed as being legal on a legality list associated with computing-based device 102. In yet another possible implementation, an isolation environment 300 or program isolation system 302 can be deduced to be legal if it is declared acceptable by a user or administrator. In yet another possible implementation, an isolation environment 300 or program isolation system 302 can be deduced to be legal if it is declared acceptable by a user or administrator or if it is from a known source or its code is authenticated. In one implementation, investigations regarding the legality of isolation environments 300 and program isolation systems 302 on computing-based device 102 are conducted by detection module 500.

If an illegal isolation environment 300 or a program isolation system 302 is found on computing-based device 102, the illegal isolation environment 300 or a program isolation system 302 can be removed by security module 128 and/or control module 502.

In another possible implementation, computing-based device 102 can be checked for illegal isolation environments 300 or program isolation systems 302 by booting computing-based device 102 from secure memory(s) 134. For example, computing-based device 102 can switched off and booted from secure memory(s) 134 devoid of isolation environments 300, program isolation systems 302, or any instruction to create such elements. Secure memory(s) 134 includes instructions and data to boot computing-based device 102 into a pre-determined operating system including security module 128. Once the pre-determined operating system is installed and run, detection module 500 in security module 128 can search for instructions to implement isolation environments 300 and program isolation systems 302. These instructions can then be removed by control module 502.

Exemplary Method(s)

FIG. 6

Figure 6:
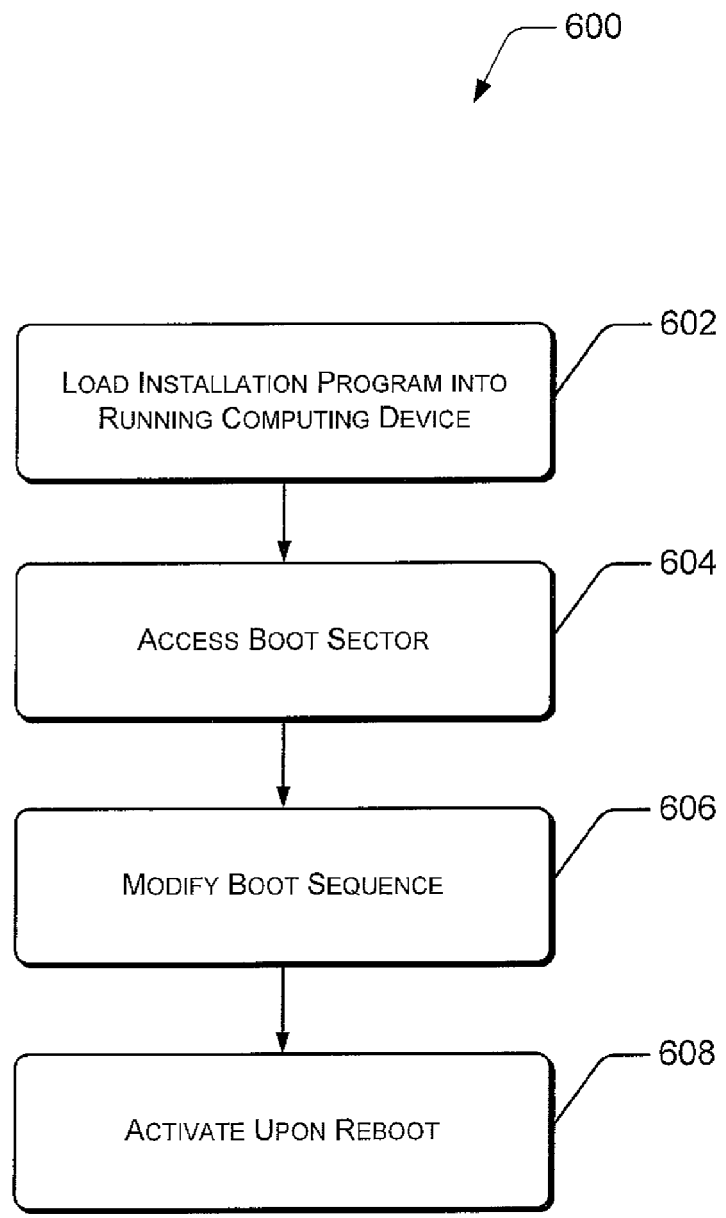
FIG. 6 illustrates exemplary method(s) for installing programs for isolation environment-based information access.

FIG. 6 illustrates an exemplary method 600 for installing instructions to implement isolation environment-based information access. Method 600 is described with reference to the exemplary elements shown in FIGS. 1-5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 602, an isolation environment installation program, such as IEI program 204, is loaded into a running computing-based device such as computing-based device 102. The isolation environment installation program includes data and commands that instruct the computing-based device to load one or more isolation environments, such as isolation environments 300 and/or program isolation system 302, when the computing-based device is next booted.

The installation program can be loaded by one or more programs running on the computing-based device, or the installation program can be loaded from sources such as hard disks, optical disks, USB storage devices, or one or more networked devices coupled to the computing-based device. Moreover, the isolation environment installation program can be loaded into a running computing-based device through user interaction. For example, a user may enter the isolation environment installation program to the computing-based device through a keyboard or other I/O device.

The isolation environment installation program can be run in a high level mode, such as a user mode, or in a low level mode, such as kernel mode. Moreover, the isolation environment installation program can be one or more of a virus, worm, spyware, trojan, and so on. Additionally, the isolation environment installation program may be purposefully or inadvertently loaded by a user on the computing-based device when the user visits a website, opens an email, opens or views an attachment, runs an application, etc.

At block 604, a boot sector of the computing-based device is accessed by the isolation environment installation program or by a program associated with the isolation environment installation program. For example, the isolation environment installation program can access the boot sector 122 and/or master boot record 124 of computing-based device 102.

In one embodiment, the boot sector is accessed by modifying access rights of one or more programs running on the computing-based device to that of super-user, administrator, root or equivalent. In another embodiment, the boot sector is accessed by exploiting vulnerabilities in operating systems or applications running on the computing-based device. In yet another embodiment, access rights are modified by exploiting one or more vulnerabilities of programs running on the computing-based device.

At block 606, the boot sequence is modified to load the isolation environment installation program during booting of the computing-based device. In one embodiment, the boot sequence of the computing-based device is modified by writing data and instructions into the boot sector. In another embodiment, one or more programs executed during booting are modified to load other programs such that the isolation environment installation program is loaded by the computing-based device on boot up.

At block 608, the isolation environment installation program is activated upon rebooting of the computing-based device 102. In one embodiment, computing-based device 102 can be rebooted by displaying instructions via I/O devices, such as a monitor, advising a user interacting with the computing-based device to reboot. In another embodiment, the computing-based device can be rebooted by causing a fault requiring a reboot.

FIG. 7

Figure 7:
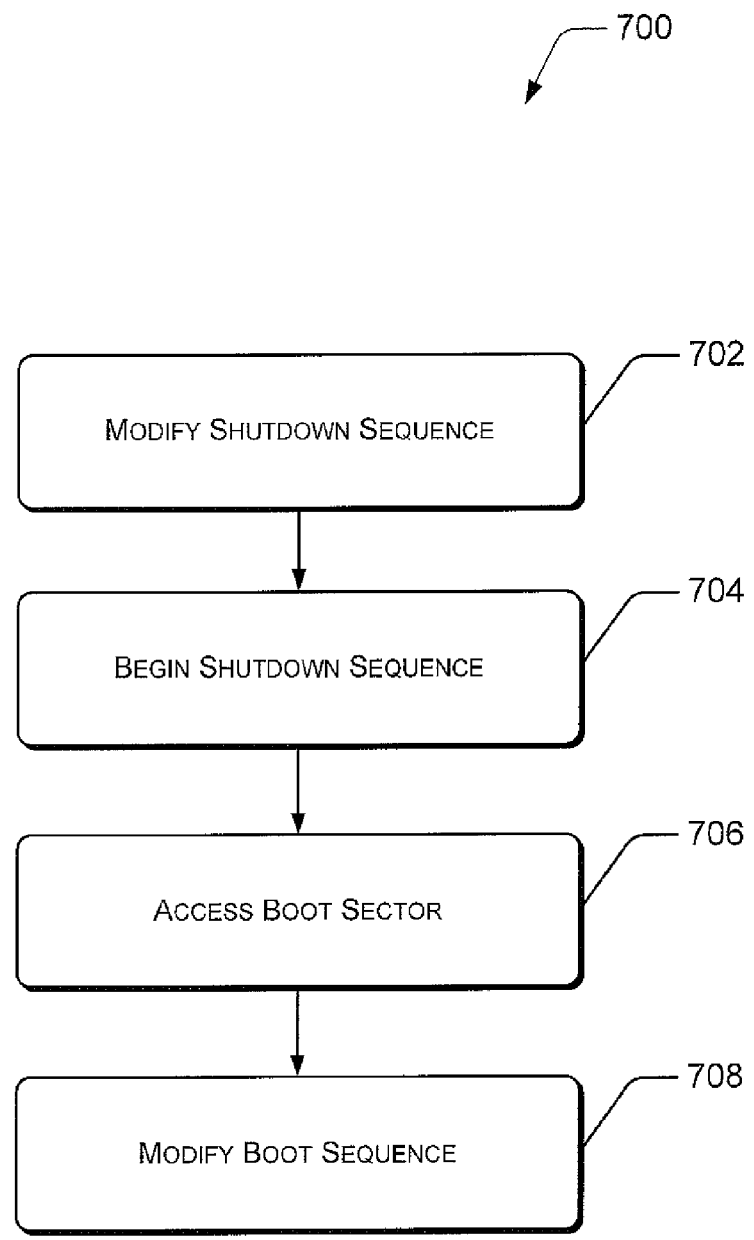
FIG. 7 illustrates exemplary method(s) for modifying a boot sequence to implement a system for isolation environment-based information access.

FIG. 7 illustrates an exemplary method 700 for installing instructions to implement isolation environment-based information access by modifying a boot sequence prior to shutting down a computing-based device. Method 700 is described with reference to the exemplary elements shown in FIGS. 1-5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 702, a shutdown sequence of a computing-based device such as computing-based device 102 is modified. In one embodiment, program(s) running on the computing-based device, such as IEI program 204 or program isolation module 126, modify the shutdown sequence by manipulating data and instructions called during the shutdown sequence. In another embodiment, communication between various programs running on the computing-based device is manipulated to install programs to be called during the shutdown sequence. In yet another embodiment, additional programs including instructions to install programs to be called during the shutdown sequence are installed by applications running on the computing-based device. In a further embodiment, the shutdown sequence may be manually modified by a user, administrator or other entity.

At block 704, the computing-based device receives instructions to begin the shutdown sequence. These instructions can be received from a program running on the computing-based device, or they can be received through user interaction with the computing-based device. For example, in one exemplary implementation, a program modifying the shutdown sequence at block 702 can include information creating a fault or error, requiring the computing-based device to restart according to existing protocols on the computing-based device. Alternately, in another possible embodiment, a program modifying the shutdown sequence at block 702 can include information creating an error window instructing a user interacting with the computing-based device to manually restart the computing-based device, thus instigating the shutdown sequence.

At block 706, the boot sequence modified in block 702 is executed as the computing-based device shuts down. In one embodiment, programs installed in block 702 are executed during the shutdown sequence to access a boot sector and or master boot record, such as boot sector 122 and master boot record 124. These programs can be provided with rights and/or privileges equivalent to those of a super user, administrator, root, and so on, to gain access to the boot sector and/or master boot record. Provision of privileges and/or rights in this manner to the programs can be accomplished by, for example, modifying programs on the computing-based device with such privileges to access the boot sector and/or master boot record. Alternately, programs can be provided with privileges equivalent to those of a super user, administrator or root by exploiting vulnerabilities in programs running on the computing-based device, such as operating systems or applications.

At block 708, the boot sequence is modified. In one embodiment, the boot sequence is modified by manipulating data and/or instructions in the boot sector and/or master boot record. The modification can include instructions to access new programs the next time the computing device is booted up. Alternately, the modifications to the boot sequence can include instructions to run certain programs before other programs upon the next boot up. For example, the modified boot sequence can instruct the computing-based device to load programs implementing isolation environments, such as isolation environment 300 and program isolation system 302, such that other programs on the computing-based device, such as operating systems and other applications, can be run on top of, or isolated within, the isolation environments.

FIG. 8

Figure 8:
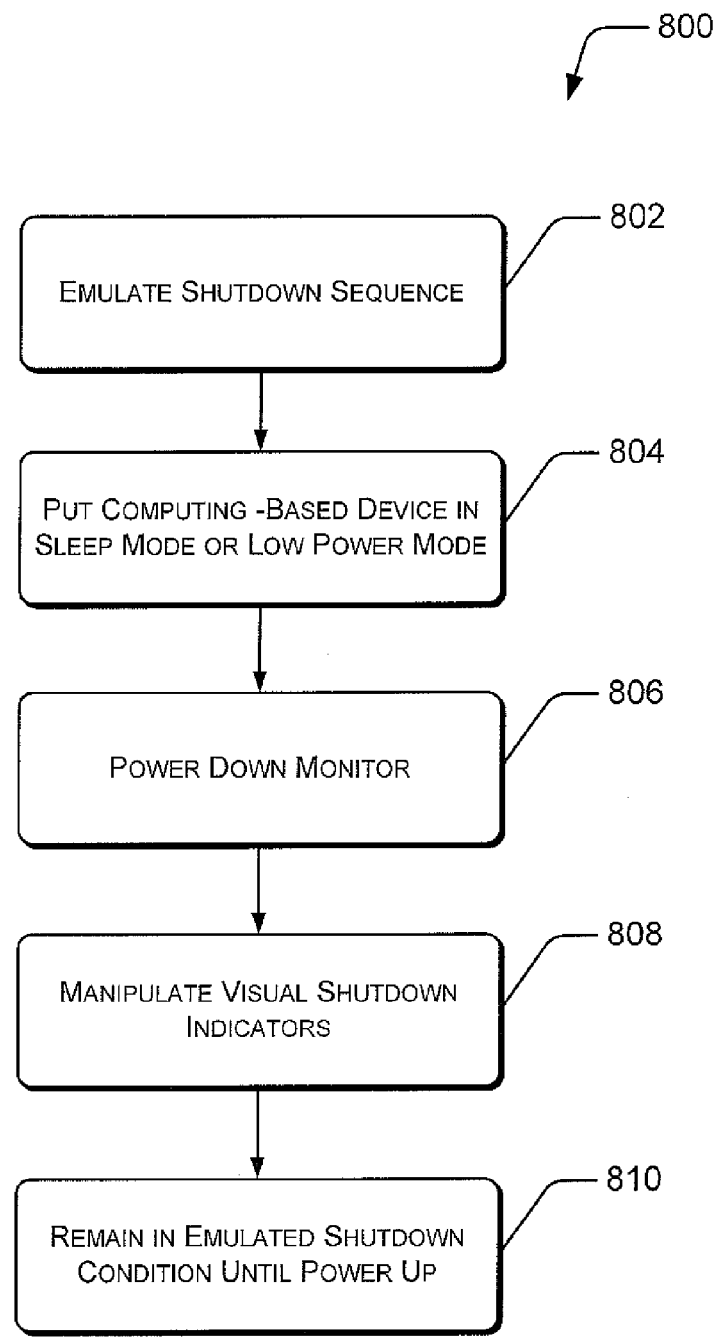
FIG. 8 illustrates exemplary method(s) for power-down emulation in isolation environment-based information access.

FIG. 8 illustrates an exemplary method 800 for emulating shutdown of a computing-based device. Method 800 is described with reference to the exemplary elements shown in FIGS. 1-5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 802, a shutdown sequence for the computing-based device, such as computing-based device 102, is emulated. In one implementation, emulation can be implemented by programs or modules such as program isolation module 126 and IEI program 204. The shutdown sequence of computing-based device 102 can be emulated by visually displaying images associated with previous shutdown processes on the computing-based device on a monitor. In this way, a user interacting with the computing-based device can be led to believe that the computing-based device is actually shutting down.

At block 804, parts of hardware of the computing-based device are powered down or put in sleep mode or low power mode to reduce power consumption and imitate shutting down. In one embodiment, the speed of hard disks on the computing-based device are reduced to zero and other devices, such as network cards, serial and parallel ports, keyboards and mice are powered down or put in low power mode.

At block 806, one or more monitors coupled to the computing-based device are powered down by modifying states of relevant hardware, for example, a video card or a power supply. In one implementation, an operating system running in an isolation environment on the computing-based device is shut down, and display images generated by the operating system during this process are displayed on the one or more monitors of the computing based device. Thus a user of the computing-based device can be presented with a real shutdown experience, even though hardware and other operating systems on the computing based device may still be active after the displayed shutdown sequence has concluded.

At block 808, all devices and elements on the computing-based device providing a visual indication of power down in a normal shutdown sequence are manipulated to emulate their state at shutdown. For example, any LEDs on the computing-based device indicating that the computing-based device is on are switched off. In another possible implementation, LEDs connected to a network card on the computing-based device are switched off.

At block 810, the computing-based device maintains its shutdown emulation, while still remaining active. During this time, selected elements on the computing-based device, such as programs, can continue running. Moreover, isolation environments such as isolation environments 300 and program isolation systems 302 can continue to collect information from, and manipulate resources on, hardware such as hardware 104. For example, once the computing-based device is in an emulated shutdown condition, hardware resources can be used to carry out assorted functions—like sending emails—unbeknownst to the isolated operating system 200, or users using the computing-based device. Also, by emulating shutdown, programs still running on the computing-based device, as well as hardware and other resources on the computing based-device, can be exploited unbeknownst to the isolated operating system 200 or users of the computing-based device.

FIG. 9

Figure 9:
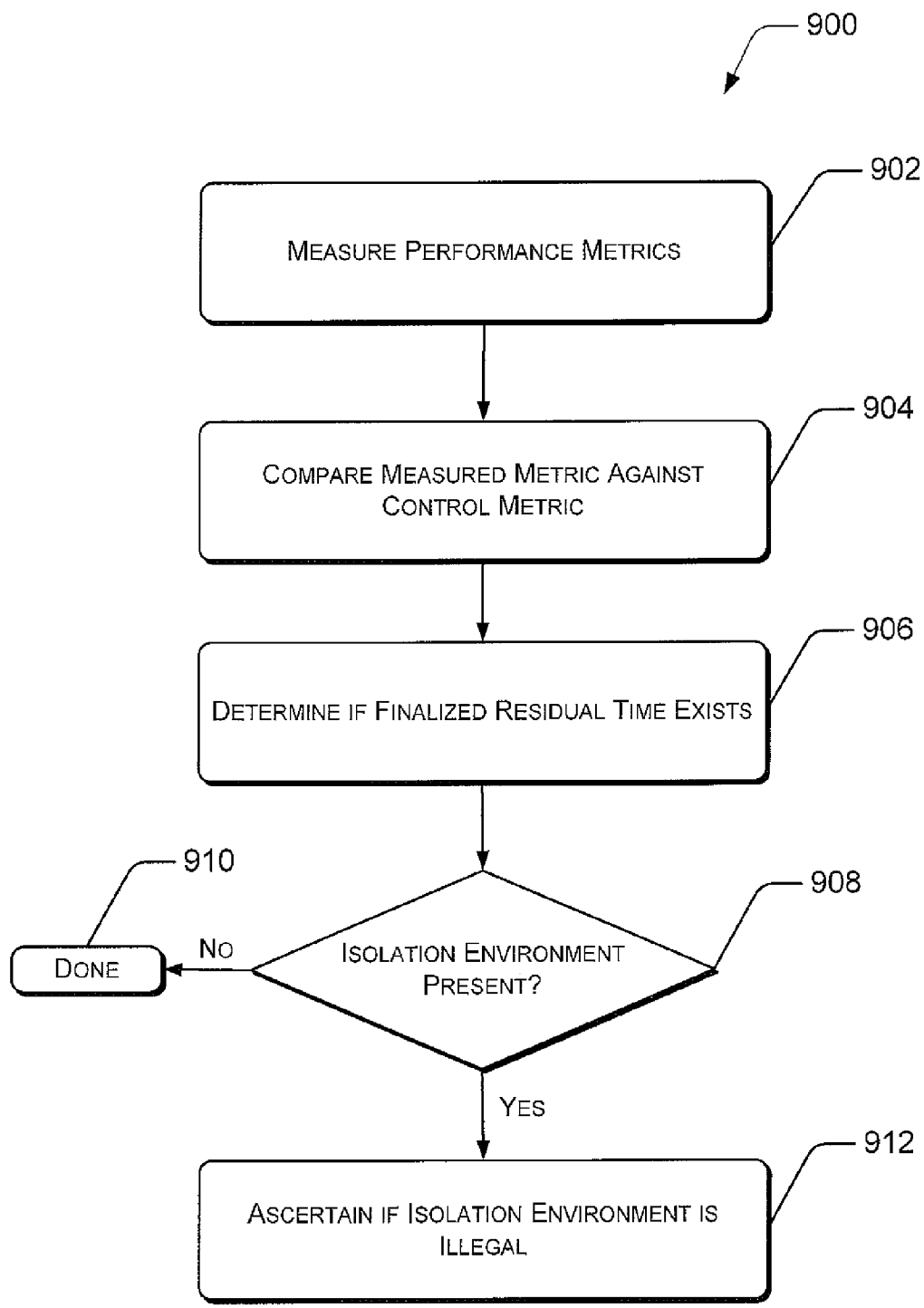
FIG. 9 illustrates exemplary method(s) for detecting isolation environments in an embodiment of isolation environment-based information access.

FIG. 9 illustrates an exemplary method 900 for detecting an isolation environment on a computing-based device. Method 900 is described with reference to the exemplary elements shown in FIGS. 1-5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 902, metrics regarding the performance of a computing-based device, such as computing device 102, or programs being run on the computing-based device are measured. For example, times required to load or execute programs—such as word processors, web browsers, email clients, graphic applications, etc.—on the computing-based device can be measured. Times can be measured through use of, for example, an inbuilt clock, a real time clock, an external clock, or any other timing devices or timing methods known in the art.

For example, an execution time for a program can be measured by measuring the time it takes for a program to execute one or more commands such as to save, open a file, load an image, parse a file, index a database, etc. Commands to load or execute may be issued to programs being measured either automatically or manually. Moreover, commands to load or execute may be issued to programs being measured by programs running on the computing-based device or by programs running on devices connected to the computing-based device over networks, such as network 132, on serial port(s), parallel port(s), etc.

At block 904, actual metrics measured in block 902 are compared with control values for the same operations measured on a model computing-based device without an isolation environment, such as isolation environment 300 and program isolation system 302. For example, an execution time for a program to open a file on the computing-based device under consideration as measured in block 902, can be compared against a control value measured on the model computing-based device to perform the same operation.

Differences between execution times measured at block 902 and control values for the same operations can be called residual times. In one embodiment, each residual time is adjusted for known differences of performance in the computing-based device under consideration versus the model computing-based device used to derive the control values. For example, if the model computing-based device has a faster processor than the actual computing-based device under consideration, the processor speeds can be examined to determine an expected difference between the two devices if both devices are devoid of isolation environments.

At block 906 it is determined if a finalized residual time exists after adjustments have been made for differences between the model computing-based device versus the computing-based device being measured. If a finalized residual time does not exist ('no' path from block 908), then an isolation environment is likely not present on the computing-based device being measured, and method 900 can end at block 910.

Alternately, if a finalized residual time exists, and the finalized residual time is above a pre-determined value calculated to take into account factors such as measuring errors, etc. ('yes' path from block 908), it can be deduced that one or more isolation environments are likely active on the computing-based device being measured.

At block 912, the legality of any isolation environments present on the computing-based device being measured is determined. In one embodiment, each program discovered on the computing-based device is checked against a pre-determined list of acceptable programs running on the computing-based device. An isolation environment is declared illegal if it is not an acceptable program. In another embodiment, an isolation environment is declared illegal if it is declared unacceptable by a user or administrator. In yet another embodiment, an isolation environment is declared illegal if it is from an unknown source or its code is not authenticated.

FIG. 10

Figure 10:
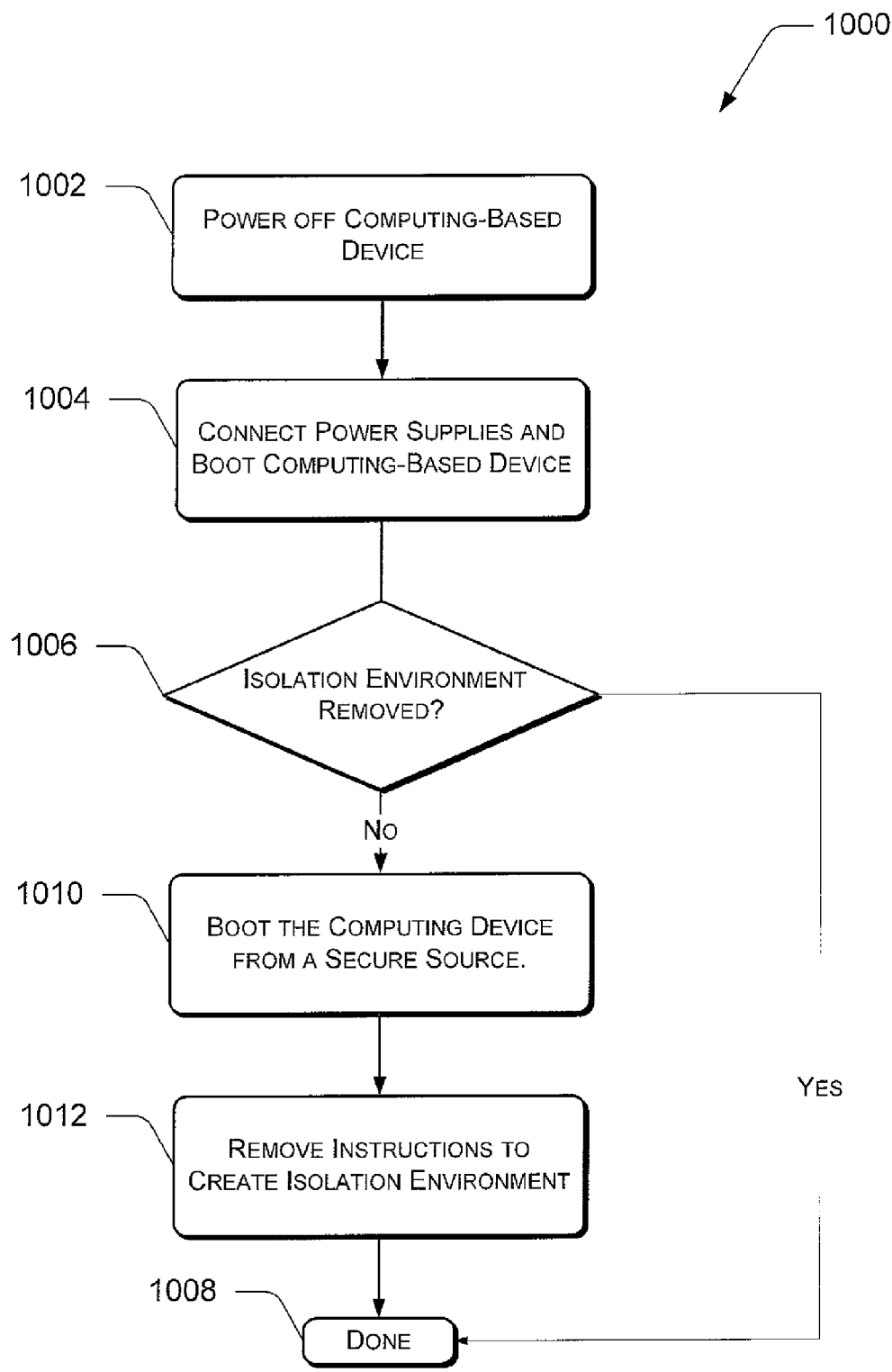
FIG. 10 illustrates exemplary method(s) for creating a secure environment free of unwanted isolation environments in an embodiment of isolation environment-based information access.

FIG. 10 illustrates an exemplary method 1000 for removing an isolation environment from a computing-based device. Method 1000 is described with reference to the exemplary elements shown in FIGS. 1-5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1002, a computing-based device, such as computing-based device 102, is powered off and disconnected from all power supplies, including power lines, batteries, or any other source of electrical power which powers the computing-based device.

At block 1004, the computing-based device is connected to a power supply and switched on to boot the computing-based device into operation. The computing-based device can boot into an isolation environment, such as isolation environment 300 and program isolation system 302, or into an operating system.

At block 1006, the computing-based device is checked for the absence of isolation environments, and if none are found ('yes' path from block 1006) method 1000 ends (block 1008). Alternately, if one or more isolation environments are found ('no' path from block 1006) method 1000 proceeds to block 1010. In one exemplary implementation, the computing device can be checked for isolation environments using method 800 discussed above.

At block 1010, the computing-based device is switched off and booted from a secure source devoid of isolation environments or instructions to create isolation environments. In one exemplary implementation, the secure source may include secure memory(s) 134. The secure source includes instructions and data to boot the computing-based device into a predetermined operating system.

At block 1012, the installed pre-determined operating system and or applications running on the pre-operating system remove instructions to create isolation environments from the computing-based device.

At block 1008, the isolation environments, and instructions to create them, have been removed from the computing-based device and method 1000 can end.

FIG. 11

Figure 11:
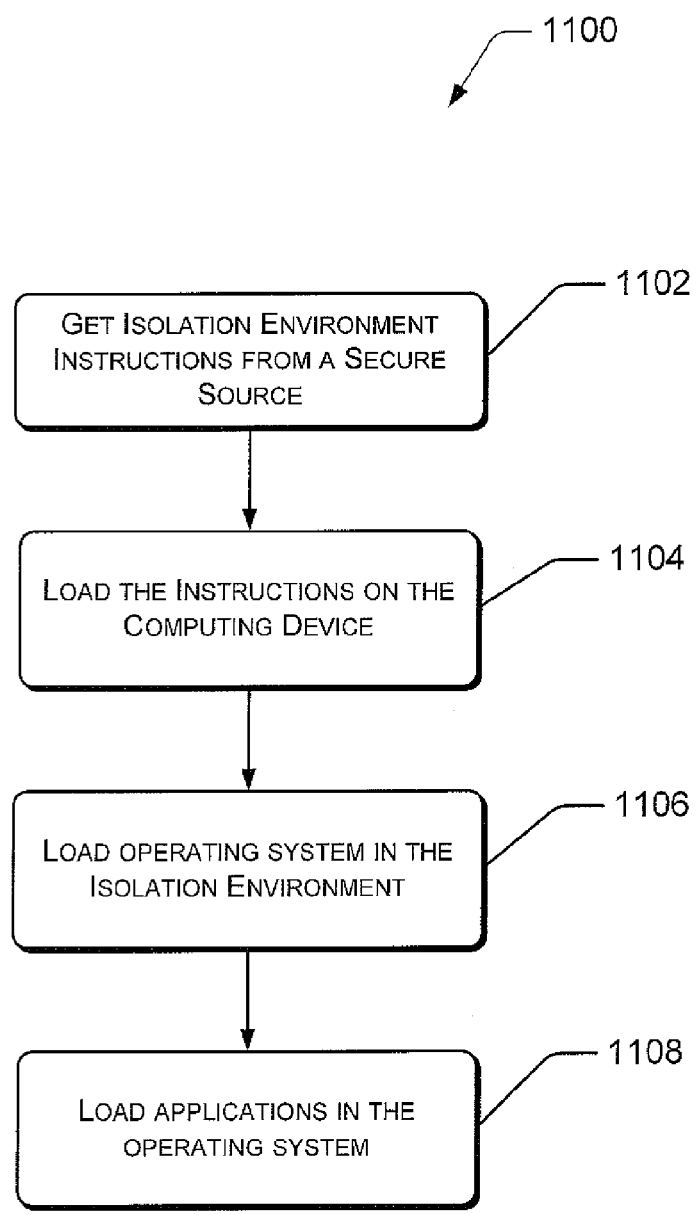
FIG. 11 illustrates exemplary method(s) for removing illegal isolation environments in an embodiment of isolation environment-based information access.

FIG. 11 illustrates an exemplary method 1100 for creating a secure isolation environment. Method 1100 is described with reference to the exemplary elements shown in FIGS. 1-5. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1102, instructions and data to create a secure isolation environment, are obtained from a secure source, which has been pre-authenticated and is known to include an authenticated set of instructions and data to create an isolation environment. One exemplary secure source could be secure memory(s) 134. Additionally, exemplary isolation environments include isolation environment 300 and program isolation system 302.

At block 1104, the authenticated set of instructions and data is loaded into the computing-based device, for example computing-based device 102, to create a secure isolated environment. The authenticated set of instructions and data can be loaded onto the computing-based device in a variety of ways. For example, the authenticated set of instructions and data can be introduced to the computing-based device on portable media, such as optical disk, USB drives, or any other portable media known in the art. Similarly, the authenticated set of instructions and data can be transmitted to the computing-based device over a network, such as network 132.

At block 1106, an isolation environment is created and an operating system, such as operating system 200, is loaded into the isolation environment. In one embodiment, creating a secure isolation environment prevents installation of applications, such as native application(s) 304 and intercepting operating system 140. For example, programs running in a secure isolation environment, such as IEI program 204, are prevented from accessing resources outside of the secure isolation environment by the secure isolation environment. In this way, programs running in the secure isolation environment are precluded from accessing the boot sector to modify the master boot record and implement the installation of other programs.

Figure 12:
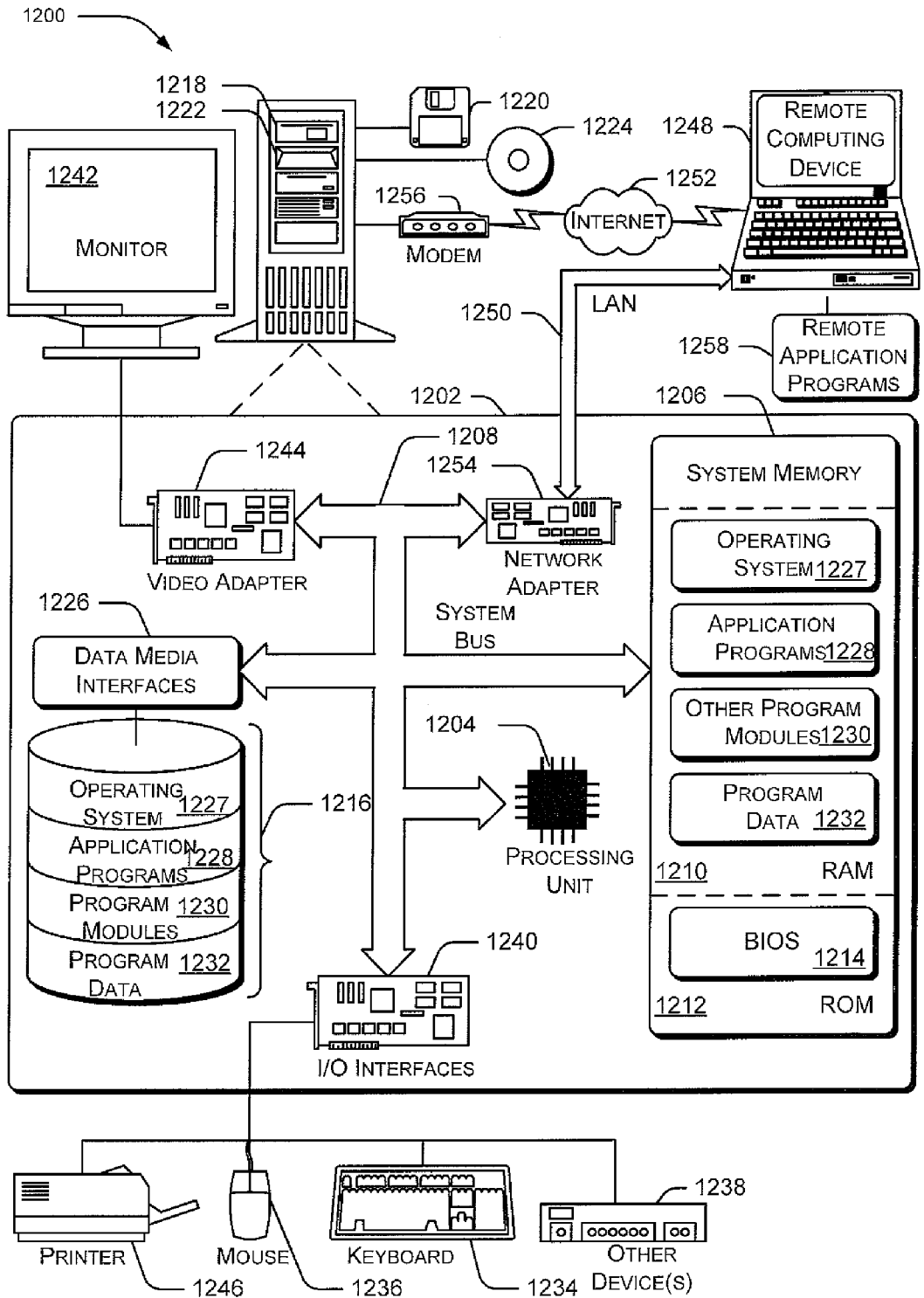
FIG. 12 illustrates exemplary computing-based device(s) in which aspects of isolation environment-based information access can be implemented.

At block 1108, one or more application(s) are loaded by the operating system onto the computing-based device Exemplary Computer Environment FIG. 12 illustrates an example of a general computer environment 1200, which can be used to implement the techniques described herein, and which may be representative, in whole or in part, of elements described herein. The computer environment 1200 is only one example of a computing environment and is not intended to suggest any limitation as to the scope of use or functionality of the computer and network architectures. Neither should the computer environment 1200 be interpreted as having any dependency or requirement relating to any one or combination of components illustrated in the example computer environment 1200.

Computer environment 1200 includes a general-purpose computing device in the form of a computer 1202. Computer 1202 can be, for example, a desktop computer, a handheld computer, a notebook or laptop computer, a server computer, a game console, and so on. The components of computer 1202 can include, but are not limited to, one or more processors or processing units 1204, a system memory 1206, and a system bus 1208 that couples various system components including the processor 1204 to the system memory 1206.

The system bus 1208 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1202 typically includes a variety of computer readable media. Such media can be any available media that is accessible by computer 1202 and includes both volatile and non-volatile media, removable and non-removable media.

The system memory 1206 includes computer readable media in the form of volatile memory, such as random access memory (RAM) 1210, and/or non-volatile memory, such as read only memory (ROM) 1212. A basic input/output system (BIOS) 1214, containing the basic routines that help to transfer information between elements within computer 1202, such as during start-up, is stored in ROM 1212. RAM 1210 typically contains data and/or program modules that are immediately accessible to and/or presently operated on by the processing unit 1204.

Computer 1202 may also include other removable/non-removable, volatile/non-volatile computer storage media. By way of example, FIG. 12 illustrates a hard disk drive 1216 for reading from and writing to a non-removable, non-volatile magnetic media (not shown), a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1226. Alternatively, the hard disk drive 1216, magnetic disk drive 1218, and optical disk drive 1222 can be connected to the system bus 1208 by one or more interfaces (not shown).

The disk drives and their associated computer-readable media provide non-volatile storage of computer readable instructions, data structures, program modules, and other data for computer 1202. Although the example illustrates a hard disk 1216, a removable magnetic disk 1220, and a removable optical disk 1224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1216, magnetic disk 1220, optical disk 1224, ROM 1212, and/or RAM 1210, including by way of example, an operating system 1227, one or more application programs 1228, other program modules 1230, and program data 1232. Each of such operating system 1227, one or more application programs 1228, other program modules 1230, and program data 1232 (or some combination thereof) may implement all or part of the resident components that support the distributed file system.

A user can enter commands and information into computer 1202 via input devices such as a keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to the processing unit 1204 via input/output interfaces 1240 that are coupled to the system bus 1208, but may be connected by other interface and bus structures, such as a parallel port, game port, or a universal serial bus (USB).

A monitor 1242 or other type of display device can also be connected to the system bus 1208 via an interface, such as a video adapter 1244. In addition to the monitor 1242, other output peripheral devices can include components such as speakers (not shown) and a printer 1246 which can be connected to computer 1202 via the input/output interfaces 1240.

Computer 1202 can operate in a networked environment using logical connections to one or more remote computers, such as a remote computing device 1248. By way of example, the remote computing device 1248 can be a personal computer, portable computer, a server, a router, a network computer, a peer device or other common network node, and the like. The remote computing device 1248 is illustrated as a portable computer that can include many or all of the elements and features described herein relative to computer 1202.

Logical connections between computer 1202 and the remote computer 1248 are depicted as a local area network (LAN) 1250 and a general wide area network (WAN) 1252. Such networking environments are commonplace in offices, enterprise-wide computer networks, intranets, and the Internet.

When implemented in a LAN networking environment, the computer 1202 is connected to a local network 1250 via a network interface or adapter 1254. When implemented in a WAN networking environment, the computer 1202 typically includes a modem 1256 or other means for establishing communications over the wide network 1252. The modem 1256, which can be internal or external to computer 1202, can be connected to the system bus 1208 via the input/output interfaces 1240 or other appropriate mechanisms. It is to be appreciated that the illustrated network connections are exemplary and that other means of establishing communication link(s) between the computers 1202 and 1248 can be employed.

In a networked environment, such as that illustrated with computing environment 1200, program modules depicted relative to the computer 1202, or portions thereof may be stored in a remote memory storage device. By way of example, remote application programs 1258 reside on a memory device of remote computer 1248. For purposes of illustration, application programs and other executable program components such as the operating system are illustrated herein as discrete blocks, although it is recognized that such programs and components reside at various times in different storage components of the computing device 1202, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although aspects and embodiments of isolation environment-based information access have been described in language specific to structural features and/or methods, it is to be understood that the subject of the appended claims is not necessarily limited to the specific features or methods described. Rather, the specific features and methods are disclosed as exemplary implementations of isolation environment-based information access.

The invention claimed is:

1. A method, at least partially implemented by a computing-based device, comprising:

creating an isolation environment on the computing-based device;
isolating, by the computing-based device, a program in the isolation environment and the program is running in the isolation environment;
accessing information associated with the program through the isolation environment;
providing misinformation to the program via the isolation environment, the misinformation regarding a state of one or more hardware resources of the computing-based device with respect to the program and indicating that the program is not running in the isolation environment;
accessing communications from the program by the intercepting application;
measuring, by the computing-based device, metrics of the program, the metrics of the program indicating an amount of time the program takes to execute one or more commands;
identifying, by the computing-based device, the isolation environment based on the metrics of the program;
performing, by the computing-based device, an emulated shutdown sequence of the computing-based device by providing visual indications that the computing-based device is shutdown; and
continuing access to resources of the computing-based device by the isolation environment when the emulated shutdown sequence is completed.

2. The method of claim 1, wherein creating comprises running a virtual machine on the computing-based device.

3. The method of claim 1, wherein accessing comprises one or more of copying, modifying, inserting and removing one or more of data, instructions and state information associated with the program.

4. The method of claim 1, wherein accessing comprises one or more of copying, modifying, inserting and removing one or more of data, instructions and state information associated with the computing-based device.

5. The method of claim 1, wherein accessing comprises utilizing resources of one or more of the computing-based device, and the program.

6. The method of claim 1, further comprising:
accessing a boot sector including a boot sequence of the computing-based device;
modifying the boot sequence to load instructions and commands configured to create the isolation environment when the computing-based device is next booted.

7. The method of claim 6, further comprising:
instigating a reboot through one of prompting a user to effectuate a reboot, causing a fault requiring a reboot.

8. One or more computer readable storage media comprising computer executable instructions that, when executed, direct a computing-based device to:
create a program isolation system and a first isolation environment;
load a first operating system and at least one application in the first isolation environment, the at least one application running in the first isolation environment;
access information associated with the first operating system, the at least one application, the computing-based device, or a combination thereof;
provide misinformation to the first operating system, the at least one application, or a combination thereof, via the first isolation environment, the misinformation regarding a state of hardware resources with respect to the at least one application and indicating that the at least one application is not running in the isolation environment;
determine that the first isolation environment is not an acceptable program based on a pre-determined list of acceptable programs;
boot the computer-based device from a secure memory; and
remove the first isolation environment.

9. One or more computer readable storage media as recited in claim 8, further comprising computer executable instructions that, when executed, direct the computing-based device to:
load a second operating system, the second operating system being configured to intercept commands and/or data transmitted to and/or from the first operating system and access the first operating system through use of the commands and/or data.

10. One or more computer readable storage media as recited in claim 8, further comprising computer executable instructions that, when executed, direct the computing-based device to:
access a boot sector of the computing-based device; and
modify a boot sequence in the boot sector to load instructions to create the program isolation system.

11. One or more computer readable storage media as recited in claim 10, further comprising computer executable instructions that, when executed, direct the computing-based device to:
instigate a reboot of the computing-based device.

12. One or more computer readable storage media as recited in claim 8, further comprising computer executable instructions that, when executed, direct the computing-based device to:
load one or more applications on the program isolation system, wherein the one or more applications are configured to access the information associated with one or more of the operating system, the at least one application, and the computing-based device.

13. One or more computer readable storage media as recited in claim 12, wherein the one or more applications include:
a key stroke logger;
a search engine.

14. One or more computer readable storage media as recited in claim 8, further comprising computer executable instructions that, when executed, direct the computing-based device to:
take portions of the computing-based device through an emulated shutdown sequence.

15. A computing-based device comprising:
hardware, including one or more processors and memory; and
a program isolation module executed from the memory by the processors, the program isolation module including instructions to implement a program isolation system, at least one isolation environment, or a combination thereof, wherein the program isolation system, the at least one isolation environment, or a combination thereof, are configured to perform operations comprising:
providing access to the hardware, one or more programs running on the program isolation system, the at least one isolation environment, or a combination thereof,
providing misinformation to the one or more programs running on the program isolation system, the at least one isolation environment, or a combination thereof, the misinformation regarding a state of the hardware with respect to the one or more programs;

instigating a shutdown sequence of the computing-based device by creating a fault requiring the computing-based device to shutdown;

accessing a boot sector including a boot sequence of the computing-based device during the shutdown sequence; and modifying the boot sequence during the shutdown sequence to load programs implementing the at least one program isolation system, the at least one isolation environment, or a combination thereof.

16. The computing-based device of claim 15, wherein the program isolation module implements interception of data and commands transmitted between the hardware and the one or more programs running on the program isolation system, the at least one isolation environment, or a combination thereof.

17. The computing-based device of claim 16, wherein the program isolation module saves the intercepted commands and data in the memory.

18. The computing-based device of claim 15, wherein the program isolation module comprises a virtual machine monitor, and further wherein the at least one isolation environment comprises a virtual machine.

19. The computing-based device of claim 15, wherein the program isolation module takes control over select resources of the hardware undetected by the one or more programs running on the program isolation system, the at least one isolation environment, or a combination thereof.

* * * * *